March 25, 1952
B. JONES
2,590,324
TEMPERATURE COMPENSATED MEANS FOR
MEASURING DIFFERENTIAL PRESSURES
Filed March 28, 1944
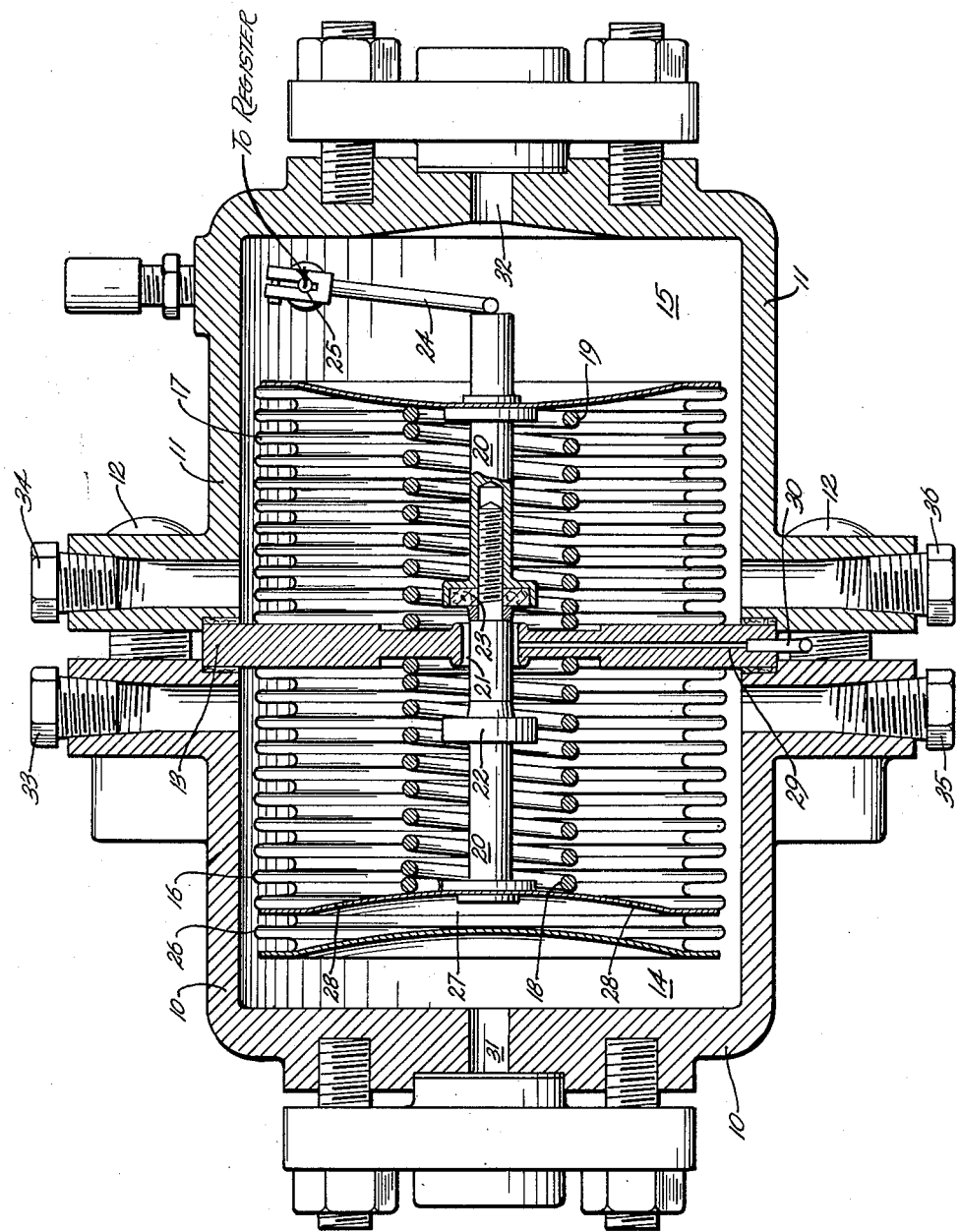
Inventor
BARTON JONES
By Hazard and Miller
Attorneys Patented Mar. 25, 1952

2,590,324

UNITED STATES PATENT OFFICE 2,590,324

TEMPERATURE COMPENSATED MEANS FOR MEASURING DIFFERENTIAL PRESSURES

Barton Jones, Los Angeles, Calif.

Application March 28, 1944, Serial No. 528,409

8 Claims. (Cl. 137—156.5)

This invention relates to a temperature compensated means for measuring differential pressures. The application may be considered as a continuation in part of the subject matter disclosed in my copending application Serial No. 490,423, filed June 11, 1943, now Patent No. 2,400,048, dated May 7, 1946.

In the above-mentioned application a differential pressure measuring device is disclosed wherein there is a central partition or supporting member having two opposed bellows mounted thereon. These bellows have their interiors in communication with each other and are filled with an incompressible liquid. The outer ends of the bellows are rigidly connected so that they are caused to move in unison. The pressures, the differential between which is to be measured, are conducted to the exteriors of the two bellows and means is provided for closing off communication through the central partition from one bellows to the other in the event that the differential between the pressures becomes excessive so that under such abnormal conditions the device will not be ruptured or permanently distorted.

The device disclosed in the above-mentioned application has proven highly advantageous in measuring differentials between pressures where there is danger of the differential becoming excessive and where temperature conditions are either constant or substantially so. Where circumstances are such that there is a wide temperature fluctuation I find that the expansion and contraction of the liquid that is confined within the bellows is such as to cause erroneous readings to be sometimes obtained. This is very apt to be due to the fact that the expansion or contraction of the liquid that is confined within the bellows manifests itself on one bellows more so than on the other. This is especially true when the bellows employed have shallow and relatively stiff corrugations in their side walls as the effect of the expansion or contraction of the filling liquid causes a considerable change in the internal pressure of the bellows. Under these circumstances unless the bellows have exactly the same effective area this pressure change manifests itself by causing the free ends of the bellows to move until a state of equilibrium is reached. Consequently, I find that under certain circumstances a mere change of temperature will result in the change of the reading obtained even though there has been no alteration or change in the pressures conducted to the device whose differential it is desired to determine.

An object of the present invention is to provide an improved differential pressure measuring device possessing all of the advantages that are presented in the construction disclosed in the above-mentioned application and which, in addition thereto, is so compensated for temperature variation that ordinary temperature fluctuations will not manifest themselves in the instrument by producing erroneous or different readings.

More specifically, an object of the invention is to provide a differential pressure measuring device having a central partition, a pair of opposed bellows mounted thereon, filled with an incompressible liquid, the outer ends of the bellows being rigidly connected so as to be caused to move in unison with the bellows being in communication with each other through the partition and communication being adapted to be cut off when the differential of pressures becomes excessive and to provide a supplemental or auxiliary chamber capable of expanding and contracting which permits of the expansion and contraction of the confined liquid in such a manner that it will not affect or influence proper operation of the device in accordance with the pressures that are to be read.

With the foregoing and other objects in view, which will be made manifest in the following detailed description and specifically pointed out in the appended claims, reference is had to the accompanying drawings for an illustrative embodiment of the invention, wherein:

The figure is a longitudinal section through the temperature compensated means for measuring differential pressures embodying the present invention.

Referring to the accompanying drawings wherein similar reference characters designate similar parts throughout, 10 and 11 indicate the opposed parts of a housing adapted to be fastened together, such as by bolts 12 in clamping engagement upon a central plate or partition 13 that divides the housing into two compartments 14 and 15. Opposed bellows 16 and 17 are mounted on opposite sides of the partition or plate 13 having their inner ends anchored thereto. Within these bellows there are compression springs 18 and 19. These bellows are of substantially equal length and have their outer ends rigidly connected to each other by means of a stem 20. Their interiors are in communication with each other through a passage 21 formed in the center of partition 13. The stem carries two opposed valves 22 and 23 either of which may seat on the valve seat provided therefor at the end of passage 21 so as to close off communication between the interiors of the bellows in the event that the differential between the pressures to be measured becomes excessive. In this manner, rupture or permanent distortion of the bellows is prevented.

The end of stem 20 engages a lever arm 24 which operates a rockshaft 25 that in turn operates an indicator or register.

On the end of bellows 16 there is a small supplemental bellows portion 26 which defines an expansible and contractible auxiliary chamber 27 that is in communication with the interior of bellows 16 by means of apertures 28. The interiors of the bellows 16 and 17 as well as chamber 27 are completely filled with incompressible liquid, and to this end I find it advantageous to completely exhaust the interiors of the bellows of air or gas by creating as high a vacuum as possible therein prior to filling the bellows with an incompressible liquid, such as for example kerosene, glycerine, or the like.

The partition 13 may have a small bore 29 formed therein equipped with a deformable tubing 30 which may be connected to a vacuum pump to create the vacuum in the bellows. After the air or gas has been completely exhausted from the bellows the incompressible liquid may be supplied through the tube and bore to completely fill both bellows and chamber 27. Thereafter tube 30 may be pinched closed and permanently sealed.

The pressures whose differential is to be measured may be conducted to the interior of the housing through ports 31 and 32 and in the event that the pressures that are conducted to the housing are conducted by liquids air bubbles in the housing may be bled out of the housing by removing plugs 33 and 34. Plugs 35 and 36 may be removed when it is desired to drain the housing.

The operation and advantages of the above-described construction are as follows: Under a given set of temperature conditions the pressures that are transmitted to the housing through ports 31 and 32 will have a predetermined effect upon the bellows and the differential between these pressures is measurable by the movement of stem 20 transmitted through lever arm 24 and rockshaft 25 to the indicator. In the event that the differential between these pressures becomes excessive stem 20 may move sufficiently so that one of the valves 22 or 23 thereon may seat and close passage 21 so that the bellows will not become permanently distorted but will return to normal operation when normal differential pressure conditions are resumed. If the temperature varies considerably causing the liquid inside of the bellows 16 and 17 to expand or contract, this expansion or contraction does not manifest itself in the corrugated walls of the two bellows, but instead, is conducted through perforations 28 to the supplemental or auxiliary chamber 27. Consequently, this chamber which has corrugated walls may expand or contract as required by the expansion or contraction of the liquid within the bellows without disturbing or in any way influencing the operation of the two bellows 16 and 17 in accordance with the pressures whose differential is to be measured. In this manner a differential pressure measuring device is provided which will properly function even though temperature conditions may vary widely.

Various changes may be made in the details of construction without departing from the spirit and scope of the invention as defined by the appended claims.

I claim:

1. A device responsive to differential pressures including a housing divided by a partition into two chambers, two opposed bellows of substantially equal effective areas having their adjacent ends secured to opposite sides of the partition and being normally in communication with each other and filled with liquid, means connecting the outer ends of each of the bellows to cause them to move in unison, expansible and contractible means attached to the outer end of one of the bellows and disposed within its chamber so as to be externally subjected to the pressure therein, said expansible and contractible means having its interior in communication with its bellows through the mentioned outer end to compensate for expansion and contraction of the liquid, and means for conducting the pressures between which a differential may exist to the two chambers respectively.

2. A device of the class described comprising a housing having two compartments defined from each other by a partition means, a bellows in each compartment, said bellows being of substantially equal effective areas and having their adjacent ends secured to the partition means, said bellows being in normal communication with each other and being filled with liquid, means connecting the unsecured ends of each bellows to each other to cause them to move in unison, an auxiliary bellows secured to one of said bellows and disposed in its compartment, said auxiliary bellows having its interior in communication with the interior of its bellows and being filled with liquid and serving to accommodate expansion and contraction of the liquid in the bellows, and means for conducting one of two fluid pressures between which a differential may exist to one compartment and means for conducting the other of said fluid pressures to the other compartment.

3. A differential pressure-responsive device including a central supporting means, pressure-responsive means of substantially equal effective areas secured to opposite sides of the central supporting means, said pressure-responsive means including movable walls, means rigidly connecting the movable walls of both pressure-responsive means to each other to cause them to operate in unison under the influence of pressures applied thereto, said pressure-responsive means being normally in communication with each other and being filled with liquid, expansible and contractible means in communication with the interiors of the pressure-responsive means through a connected movable wall of one of the pressure-responsive means for allowing the liquid therein to expand and contract, means for conducting one of the pressures between which a differential may exist to a confined space surrounding one of said pressure-responsive means, and means for conducting the other of said pressures to a confined space surrounding the other pressure-responsive means and said expansible and contractible means.

4. A differential pressure-responsive device including a central supporting means, pressure-responsive means of substantially equal effective areas secured to opposite sides of the central supporting means, said pressure-responsive means including movable walls, means rigidly connecting the movable walls of both pressure-responsive means to each other to cause them to operate in unison under the influence of pressures applied thereto, said pressure-responsive means being normally in communication with each other and being filled with liquid, means for sealing off communication between the pressure-responsive means when the differential in pressures becomes excessive, expansible and contractible means in communication with the interiors of the pressure-responsive means through a connected movable wall of one of the pressure-responsive means for allowing the liquid therein to expand and contract, means for conducting one of the pressures between which a differential may exist to a confined space surrounding one of said pressure-responsive means, and means for conducting the other of said pressures to a confined space surrounding the other pressure-responsive means and said expansible and contractible means.

5. A differential pressure-responsive device including two opposed bellows in normal communication with each other and filled with liquid, said bellows being of substantially equal effective areas and having their outer ends rigidly connected to each other, a supplemental bellows attached to one of said bellows having its interior in communication therewith through the outer end of the bellows to which it is attached to compensate for expansion and contraction of the liquid due to temperature changes, means for conducting one of the pressures between which a differential may exist to a confined space surrounding one of said bellows, and means for conducting the other of said pressures to a confined space surrounding the other of said bellows and the supplemental bellows.

6. A differential pressure-responsive device including two opposed bellows of substantially equal effective areas in normal communication with each other and filled with liquid, one end of each bellows being stationarily mounted, means connecting the other ends of each of the bellows to cause them to move in unison, a supplemental bellows attached to one of said bellows having its interior in communication therewith through its mentioned other end to compensate for expansion and contraction of the liquid, means for conducting one of the pressures between which a differential may exist to a confined space surrounding one of said bellows, and means for conducting the other of said pressures to a confined space surrounding the other of said bellows and said supplemental bellows.

7. A device responsive to differential pressures including two opposed bellows of substantially equal effective areas in normal communication with each other and filled with liquid, one end of each bellows being stationarily mounted, means connecting the other ends of each of the bellows to cause them to move in unison, a supplemental bellows attached to one of said other ends of the first mentioned bellows having its interior in communication therewith through its mentioned other end to compensate for expansion and contraction of the liquid, means for conducting one of the pressures between which a differential may exist to a confined space surrounding one of the bellows, and means for conducting the other pressure to a confined space surrounding the other bellows and the supplemental bellows attached thereto.

8. A device responsive to differential pressures including two opposed bellows of substantially equal effective areas in normal communication with each other and filled with liquid, one end of each bellows being stationarily mounted, means connecting the other ends of each of the bellows to cause them to move in unison, means for sealing off communication between the bellows when the differential between the pressures applied thereto becomes excessive, a supplemental bellows attached to one of said other ends of the first mentioned bellows having its interior in communication therewith through the mentioned other end to compensate for expansion and contraction of the liquid, means for conducting one of the pressures between which a differential may exist to a confined space surrounding one of the bellows, and means for conducting the other of said pressures to a confined space surrounding the other of the bellows and the supplemental bellows attached thereto.

BARTON JONES.

REFERENCES CITED

The following references are of record in the file of this patent:

UNITED STATES PATENTS

| Number | Name | Date |
|---|---|---|
| 1,543,061 | Danielson | Jan. 23, 1925 |
| 1,821,988 | Rowles | Sept. 8, 1931 |
| 2,082,325 | Cross | June 1, 1937 |
| 2,140,954 | Frazee | Dec. 20, 1938 |
| 2,146,176 | Donaldson | Feb. 7, 1939 |
| 2,400,848 | Jones | May 7, 1946 |

FOREIGN PATENTS

| Number | Country | Date |
|---|---|---|
| 829,790 | France | 1938 |